United States Patent
Pope, Jr.

[15] 3,664,030
[45] May 23, 1972

[54] APPARATUS FOR MAKING ROTARY CUTTING DIES

[72] Inventor: Joseph O. Pope, Jr., 395 Carey Drive, S. E., Atlanta, Ga. 30315

[22] Filed: June 11, 1969

[21] Appl. No.: 832,271

[52] U.S. Cl. ..................................33/184.5, 33/21 R, 33/78
[51] Int. Cl. ..............................................................B41b 1/00
[58] Field of Search..................................33/21 A, 184.5, 78

[56] References Cited

UNITED STATES PATENTS

| | | | |
|---|---|---|---|
| 1,886,929 | 11/1932 | Abbott | 33/78 |
| 1,965,216 | 7/1934 | Brown | 33/184.5 |
| 2,095,542 | 10/1937 | Claybourn | 33/184.5 |
| 2,417,496 | 3/1947 | Huebner | 33/184.5 |
| 3,110,107 | 11/1963 | Wilhelm | 33/21 A |

*Primary Examiner*—William D. Martin, Jr.
*Attorney*—Mason, Fenwick & Lawrence

[57] ABSTRACT

Apparatus for making dies for rotary cutting cylinders which is portable and has spaced circular mounting heads upon which a die board can be mounted for scribing, drilling, cutting, etc. One of the die heads carries a true measurement scale about its circumference, the scale being annular and concentric with the mounting die board, and spaced from the outer cylindrical surface of the die board a distance equal to the proposed projection of the cutting rules from the board surface when mounted. A tool holder is mounted on a graduated indexing bar for movement longitudinally of the cylinder, and has a tool opening having its axis radial to the cylinder. There is an index pointer over the circumferential scale on the mounting head having its point in a plane radial to the cylinder which includes the tool opening axis. This allows true measurement scales to be used throughout and the points of contact of a tool in the tool holder with the die board to form a proper circumferentially shrunken image of the article which the completed die is to cut.

8 Claims, 5 Drawing Figures

INVENTOR.
JOSEPH O. POPE, JR.
BY
Mason, Fenwick & Lawrence
ATTORNEYS

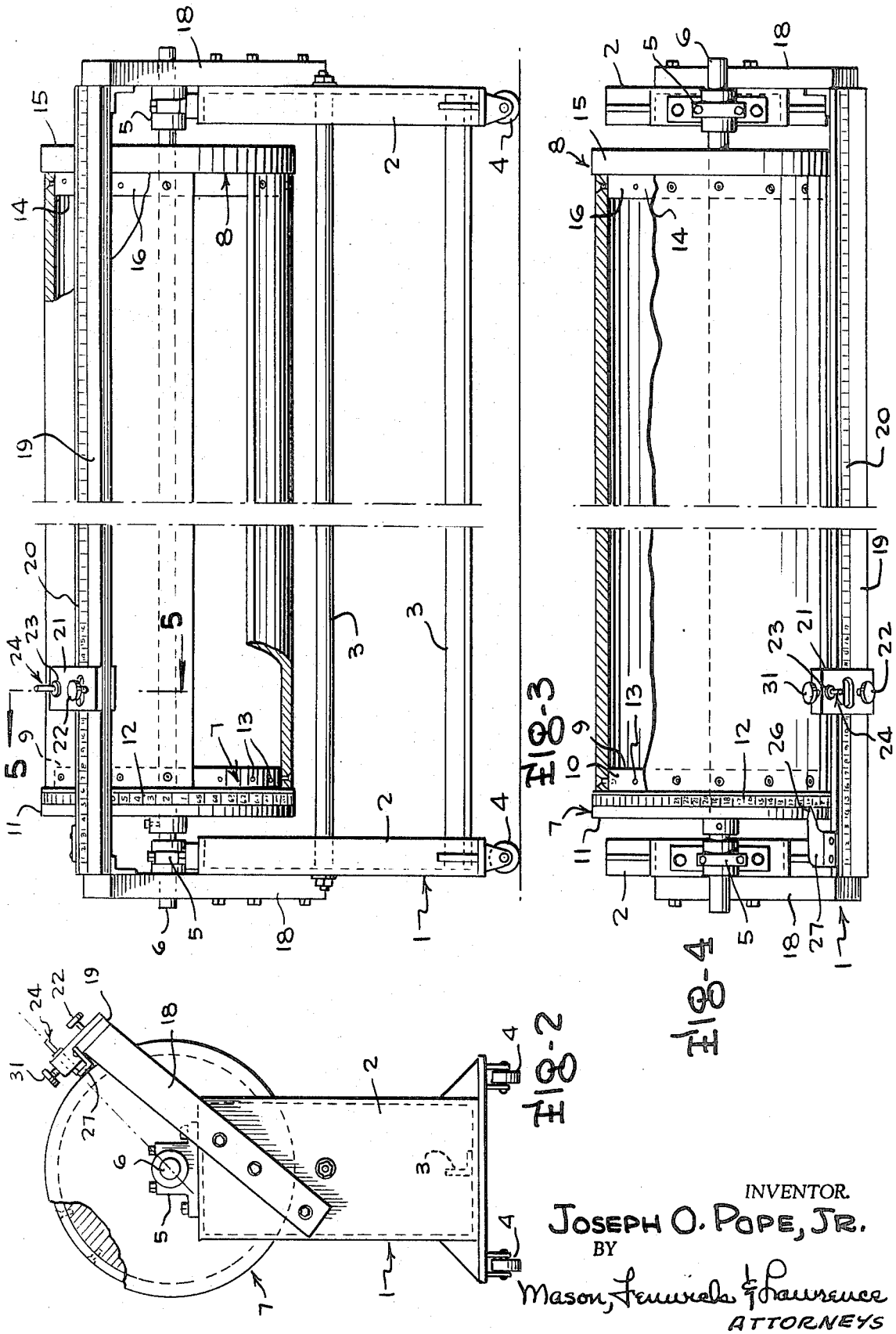

APPARATUS FOR MAKING ROTARY CUTTING DIES

BACKGROUND OF THE INVENTION

This invention relates to apparatus for use in making dies for rotary cutting cylinders employed in cutting paper, or paper board, blanks, or other articles of predetermined shape, from an advancing sheet.

Rotary cutting cylinders are used extensively in the making of box blanks and articles of similar nature. The cutting is done by means of curved dies mounted on the cylinder surface, the dies having cutting rules inserted in a mounting, or die board. Due to the fact that the cutting rules extending longitudinally of the cylinder surface when mounted must be radial to the cylinder axis for proper cutting, the grooves, or seats, in the die boards, into which the cutting rules are mounted, have a different spacing circumferentially of the die board surface than the circumferential spacing of the cutting edges of the cutting rules. As the cutting edges of the rules must be at the true circumferential spacing, the circumferentially spaced grooves in the die board represent a shrunken image of that distance, because of the radial convergence of the rules toward the die board. The proper lay-out of the board has been difficult and required special instruments.

Normally, in the past, resort has been had to a so-called shrink rule to obtain proper lay-out of circumferentially spaced lines. This rule had to be properly calibrated to represent actual measurements less radial convergence for a distance equal to the width of cutting rule to project beyond the die board. Yet in axially spaced lines, true measurements must be used. This led to confusion.

Most die boards have been laid out, or drafted, at one place, drilled for mounting holes at another location and finally sawed at some other place. Much time has been lost in this procedure.

SUMMARY OF THE INVENTION

The general object of the present invention is to provide apparatus which will enable all of the steps of drafting, drilling and sawing to take place while the material from which the die board is to be made remains fixed in a single location.

Another object of the invention is to provide such apparatus wherein all scales used are true scales, and shrinkage allowances are automatically made as various operations are performed.

A further object is the provision of means to hold tools truly radial to the surface upon which they are to work, with coacting measuring means spaced from the board's surface a distance equal to the desired projection of the cutting rules from the surface, so that all measurements can be true measurements but a shrunken projected image will result at the board surface.

Still another object is to provide means to support material of various axially lengths, with the supporting surface being of the same cylindrical curvature as the cylinder upon which the die is to be used.

Yet a further object of the invention is to provide apparatus of the above described type which is portable and can be moved to any convenient location for use.

Other objects of the invention will become apparent from the following description of one practical embodiment thereof, when taken in conjunction with the drawings which accompany, and form part of, this specification.

BRIEF DESCRIPTION OF THE DRAWINGS

FIG. 2 is a side elevation of the apparatus shown in FIG. 1;

FIG. 3 is a side elevation of the apparatus, shown on a larger scale and with the center portions broken away to reduce the over-all length;

FIG. 4 is a top plan view of the apparatus shown in FIG. 3; and

DESCRIPTION OF THE PREFERRED EMBODIMENT

Figure 5:
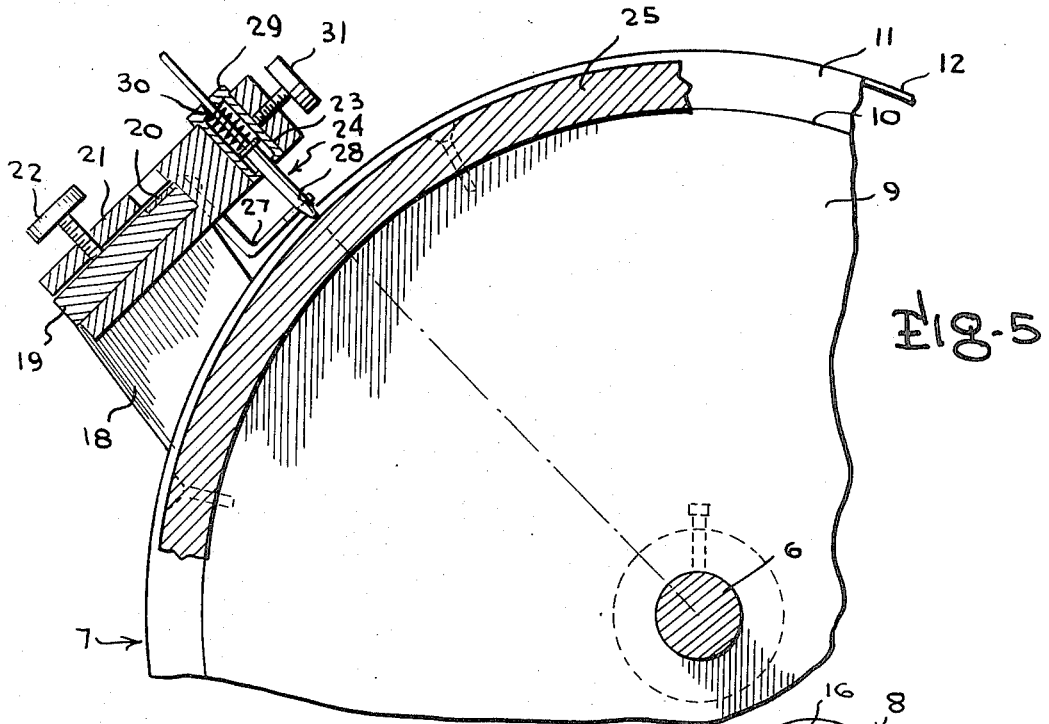
FIG. 5 is a partial vertical section, taken through the apparatus on the line 5—5 of FIG. 3, and shown on a still larger scale.
Figure 1:
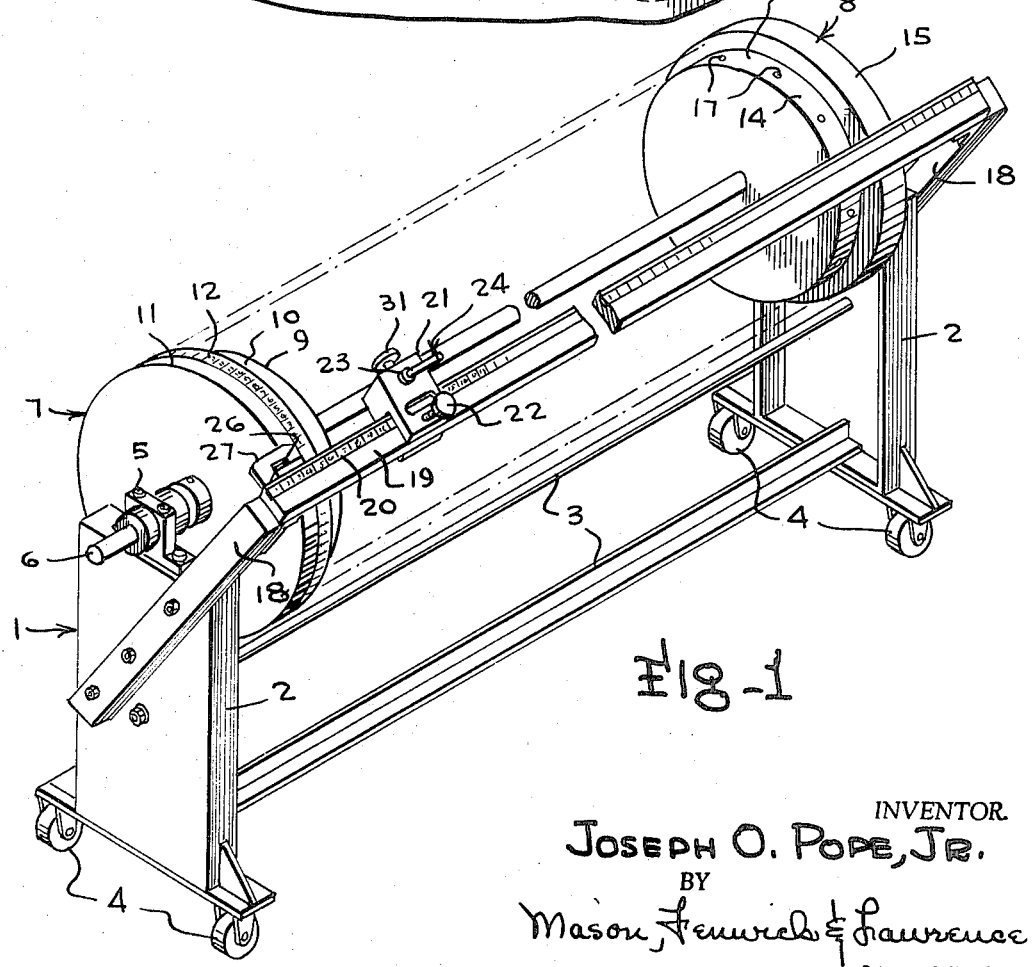
FIG. 1 is a perspective view of apparatus embodying the invention, with material for making a die board in position on the apparatus.

Referring to the drawings in detail, the operating parts of the apparatus are carried upon a wheeled frame 1. The frame consists of vertical end frames 2, held in spaced, parallel position by means of longitudinal stiffeners 3. Wheels 4 are attached to the lower corners of the end frames 2.

Each end frame 2 carries a bearing 5 centrally of its top to mount a shaft 6, which extends the length of the frame. Shaft 6 has a die board mounting head 7 fixed to it adjacent one end frame 2, and supports a second mounting head 8 which is slidable along the shaft.

Mounting head 7 is in the form of a flanged disk. The disk proper 9 has a circumferential die board receiving surface 10, which is identical in curvature to the surface of the die cylinder upon which the finished die will be mounted for use. In other words, disk 9 is of the same diameter as the die cylinder. Flange 11 of the mounting head is of greater diameter than the disk, projecting outwardly beyond the surface 10. A true measurement circumferential scale 12 is marked upon, or affixed to, the outer cylindrical surface of the flange. The radial projection of the flange from the surface 10 to the surface of scale 12 is equal to the thickness of the die board to be used plus the proposed projection of cutting rules beyond the die board surface. Thus, circumferential readings on scale 12 will be true measurements between circumferentially spaced cutting edges of cutting rules. Mounting screw holes 13 are tapped into the disk 9 equidistant apart around the surface 10. The spacing of holes 13 is the same as the spacing of the mounting screw holes in the cylinder with which the die is to be used.

The movable mounting head 8 is similar in shape to the head 7, having a disk portion 14 and a flange 15. Flange 15, however, carries no scale. The die board mounting surface 16 of disk 8 has a similar set of mounting screw holes 17.

Support arms 18 are attached to each end frame 2 in order to mount a longitudinal indexing bar 19. The arms are set at an angle to the vertical, to place the indexing bar at one side of the mounting heads so that the top areas of the mounting heads, and any die board between them, will be open and unimpeded. The longitudinal indexing bar extends the full length of the frame, and carries a true measurement scale 20. A tool holder 21 is slidably mounted on the bar, and has a thumb screw 22 to releasably hold it in positions of adjustment along the bar and scale. The tool holder has a tool receiving opening 23 in which a scribe may be mounted, or through which a drill may be placed. The longitudinal axis of opening 23 is radial to the shaft 6 and, consequently, lies in a plane which is radial to the mounting heads 7 and 8. Thus, a scribe 24, mounted in the holder, will be truly radial to a cylinder formed by mounting a curved die board 25 on the mounting heads.

Also lying in the radial plane which includes the axis of the tool opening in the holder 21 is the indicating point 26 of a circumferential indexing pointer 27 attached at one end of the longitudinal indexing bar 19 and overlying the circumferential indexing scale 12. Thus, setting the scale 12 with respect to the pointer 27 automatically sets the die board with respect to the tool holder, so that any longitudinal line marked on the die board by a scribe in the tool holder will also lie within the mentioned radial plane.

Any suitable scribe 24 may be used with the apparatus. For example, a scribe proper 28 may be slidably mounted in a tubular barrel 29 with a spring 30 within the barrel urging the scribe outwardly to maintain constant scribing pressure even though the surface being scribed may have some variation. The barrel of the scribe may be fitted within the opening 23 of the tool holder and held in proper position of adjustment by means of a set screw 31.

In using the device, a sheet of die mounting board 25 is placed in the apparatus with its ends seated upon the surfaces 10 and 16 of the mounting heads 7 and 8. As the mounting head 8 is movable along the shaft 6, boards of various length may be used. The ends of the board are then fastened to the mounting heads by inserting screws through the board and into the screw holes 13 and 17. This secures the die board to the apparatus and completes a cylinder, or partial cylinder as the case may be, having the mounting heads as its ends and the die board as its circumferential surface. When the board is so mounted, its external surface will be positioned below the circumferential scale 12 a distance equal to that which the cutting rules, when mounted in the board, will project above the board surface. The scribe 24 is then mounted in the holder 21 by inserting the barrel 29 through the opening 23. The barrel will be pressed downwardly to apply the required pressure from the scribe 28, and the barrel will then be locked in place by tightening set screw 31. The apparatus is now in condition for drafting the die pattern on the die board.

The specifications which are supplied to the maker of the die give the dimensions of the box blank, or other pattern to be cut. The dimensions given, of course, will be those which the cutting edges of the cutting rules must define when the die is complete. Nevertheless, due to the fact that the scribe axis and the indicator point 26 are mounted in a longitudinal plane which is radial to the cylinder formed by the mounting heads and die board, and also due to the fact that the scale 12 is raised above the die board surface a distance equal to the projection of the cutting rules from the surface, the point of contact of the scribe with the die board will always represent the proper position for the shrunken image of the true pattern.

With the apparatus set as above described, the cylinder is rotated to bring the zero marking on the circumferential scale 12 under the point 26 of the pointer 27. The tool holder 21 will then be moved along the longitudinal indexing bar 19 and the scribe 28 will make a base line on the die board. The cylinder will then be rotated to bring the first dimension marking of the scale 12 under the pointer 26 and a second line will be drawn. This procedure will be continued as required to place longitudinal lines on the board. For circumferential lines, the holder 21 is moved to a first selected position along the scale 20 and the holder is locked in place by means of set screw 22. The cylinder is then rotated whatever distance may be required and the scribe will make a circumferential line on the board. This can be done to join any longitudinal lines as required by the specification. The tool holder is then released and moved the required distance along the scale to position the scribe for the second line, and the tool holder is again locked in place and the cylinder rotated the required distance. By the proper placement of longitudinal and circumferential lines, any blank shape having only right angularly related lines can be drawn.

When the pattern is completed, the scribe can be removed from the tool holder and other tools inserted. For example, a compass can be inserted if circles or arcs are needed, and the opening 23 can be used as a drill guide for making mounting holes, or other openings, in the die board. Here, again, the circumferential and longitudinal indexing scales may be used to achieve proper placement.

As the indexing bar is placed to one side of the mounting heads, the entire top of the cylindrical die board will be open and free from encumbrances. This will permit the workmen to perform any type of operation that may be necessary to complete the die board. This may include cutting the grooves in which the cutting rules are to be inserted, using a jig-saw to cut the completed board from the cylinder, or perform any other operation which might be necessary.

The fact that the mounting board is held only at its ends upon the mounting heads makes it possible to use the apparatus for drilling or sawing operations. The mounting leaves the entire center of the cylinder free of obstructions.

As the apparatus is mounted upon wheels, it can be moved from place to place and the dies made wherever it may be convenient. The apparatus is quite simple and light in weight so that it will be very easy to move it from one place to another.

While one practical embodiment of the invention has been disclosed, it will be understood that the basic principles of the device can be incorporated in structures which differ considerably from that which is shown.

I claim:

1. Apparatus for making dies for rotary cutting cylinders, which dies have cylindrically curved mounting boards with cutting rules fixed thereto and projecting therefrom to outline the article to be cut, the apparatus comprising, a frame, a shaft carried by the frame, a pair of mounting heads rotatably carried by the shaft in spaced axial alignment, each mounting head having a cylindrical surface upon which the ends of die boards for making mounting boards are supported, one of said heads having an annular flange coaxial with the head and extending beyond the said cylindrical surface a distance equal to the thickness of the die board plus the proposed projection of the cutting rules beyond the board, a circumferential indexing scale about the circumference of the annular flange, an indexing bar carred by support arms extending from said frame, an indexing pointer carried by means maintaining the indexing plus the proposed projection of the cutting rules beyond the board, a circumferential indexing scale about the circumference of the annular flange, an indexing bar carred by support arms extending from said frame, an indexing pointer carried by means maintaining the indexing pointer in fixed relationship to said indexing bar and overlying the scale, and a tool holder carried by said indexing bar and having a tool axis which lies in a plane radial to the shaft.

2. Apparatus for making dies as claimed in claim 1 wherein, the indexing pointer lies in the radial plane which includes the tool axis of the tool holder.

3. Apparatus for making dies as claimed in claim 1 wherein, said indexing bar includes a scale carried by the frame bridging the spaced mounting heads, and the tool holder is mounted for longitudinal movement along the length of said indexing bar.

4. Apparatus for making dies as claimed in claim 3 wherein, one of the mounting heads is fixed to the shaft and the other mounting head is movable along the shaft to adjusted positions toward and from the fixed mounting head.

5. Apparatus for making dies as claimed in claim 4 wherein, the indexing pointer lies in the radial plane which includes the tool axis of the tool holder.

6. Apparatus for making dies as claimed in claim 5 wherein, the longitudinal indexing bar extends along the frame at one side of the vertical center of the mounting heads to leave the top of the die board unobstructed.

7. Apparatus for making dies as claimed in claim 6 wherein, the tool holder has means to fix the holder in positions of adjustment along the longitudinal indexing bar.

8. Apparatus as claimed in claim 7 wherein, the tool holder has means to releasably support a tool with the operating axis of the tool coinciding with the tool axis of the tool holder.

* * * * *